United States Patent [19]

Washizu et al.

[11] Patent Number: 5,354,106

[45] Date of Patent: Oct. 11, 1994

[54] CONNECTOR FOR CONNECTING A PIPE OF SMALL DIAMETER WITH BLOCK EXPANSION PREVENTION SURFACES

[75] Inventors: Katsushi Washizu, Shizuoka; Yuuji Miyauchi, Tagata, both of Japan

[73] Assignee: Usui Kokusai Sangyo Kaisha Ltd., Japan

[21] Appl. No.: 889,607

[22] Filed: May 27, 1992

[30] Foreign Application Priority Data

May 30, 1991 [JP] Japan .................. 3-155682

[51] Int. Cl.⁵ .............................. F16L 37/00
[52] U.S. Cl. .................. 285/319; 285/921; 285/351
[58] Field of Search ............. 285/319, 921, 351

[56] References Cited

U.S. PATENT DOCUMENTS

| | | |
|---|---|---|
| 2,892,991 | 6/1959 | Beebee et al. . |
| 3,169,030 | 2/1965 | Lippincott . |
| 3,453,005 | 7/1969 | Foults . |
| 3,826,523 | 7/1974 | Eschbaugh . |
| 3,933,378 | 1/1976 | Sanford et al. . |
| 4,026,581 | 5/1977 | Pasbrig . |
| 4,035,005 | 7/1977 | De Vincent et al. . |
| 4,074,912 | 2/1978 | Van Bilderbeek et al. . |
| 4,219,222 | 8/1980 | Brusadin . |
| 4,275,907 | 6/1981 | Hunt . |
| 4,451,069 | 5/1984 | Melone . |
| 4,601,497 | 7/1986 | Bartholomew . |
| 4,637,636 | 1/1987 | Guest . |
| 4,637,640 | 1/1987 | Fournier et al. . |
| 4,673,199 | 6/1987 | Renfrew . |
| 4,681,351 | 7/1987 | Bartholomew . |
| 4,730,856 | 3/1988 | Washizu . |
| 4,749,214 | 6/1988 | Hoskins et al. . |
| 4,753,458 | 6/1988 | Case et al. . |
| 4,776,616 | 10/1988 | Umehara et al. . |
| 4,778,203 | 10/1988 | Bartholomew . |
| 4,781,400 | 11/1988 | Cunningham . |
| 4,793,637 | 12/1988 | Laipply et al. . |
| 4,895,396 | 1/1990 | Washizu . |
| 4,913,467 | 4/1990 | Washizu . |
| 4,915,420 | 4/1990 | Washizu . |
| 4,944,537 | 7/1990 | Usui et al. . |
| 4,946,205 | 8/1990 | Washizu . |
| 4,948,180 | 8/1990 | Usui et al. . |
| 4,964,658 | 10/1990 | Usui et al. . |
| 4,997,216 | 3/1991 | Washizu . |
| 5,048,875 | 9/1991 | Usui et al. . |
| 5,087,084 | 2/1992 | Gehring .................. 285/319 |
| 5,090,747 | 2/1992 | Kotake .................. 285/319 |
| 5,094,481 | 3/1992 | Takikawa et al. . |
| 5,098,136 | 3/1992 | Washizu . |
| 5,112,084 | 5/1992 | Washizu . |
| 5,114,250 | 5/1992 | Usui . |
| 5,154,450 | 10/1992 | Washizu .................. 285/319 |
| 5,154,451 | 10/1992 | Washizu .................. 285/319 |

FOREIGN PATENT DOCUMENTS 593413 5/1959 Italy .
855603 12/1960 United Kingdom .

Primary Examiner—Eric K. Nicholson
Attorney, Agent, or Firm—Anthony J. Casella; Gerald E. Hespos

[57] ABSTRACT

A connector for connecting a pipe of small diameter in which chamber in communication with a flow bore of a cylindrical connection is are perforated axially on the side of the top end of a connector main body recessed windows are disposed to the circumferential wall of the chamber and the circumferential wall at the rear end thereof is formed as an engaging wall, the rear end of the chamber is engaged by the engaging wall and a separate receptacle member having a pair of finger walls protruded being opposed to each other in the inserting direction thereof, in which connection is made by engaging the finger wall to an annular bulged wall disposed near the connection end of a pipe incorporated to the inside of the connector main body in a state of connecting the pipe, wherein the receptacle main body 8 comprises an annular circumferential wall 7 to be attached on the outer circumferential surface at the rear part of the connector main body 1 and a pair of finger walls 5 each of a square block form being disposed to each other and protrudes substantially in perpendicular to the axial direction, and having a tapered surface 5' diverging at the protruding rear end which the formed to the inside at the top end in contiguous with a resilient arm 7' extending circumferentially in the circumferential wall along a slit 12.

2 Claims, 9 Drawing Sheets

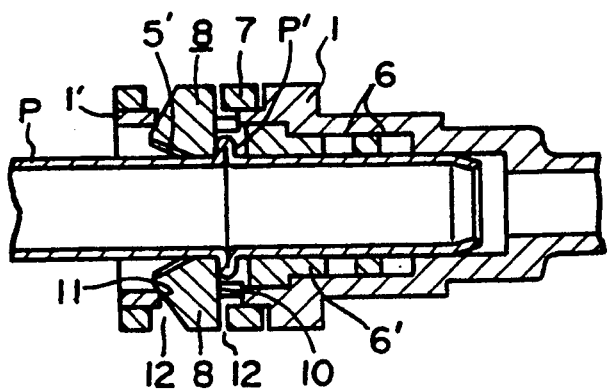
Fig. 5
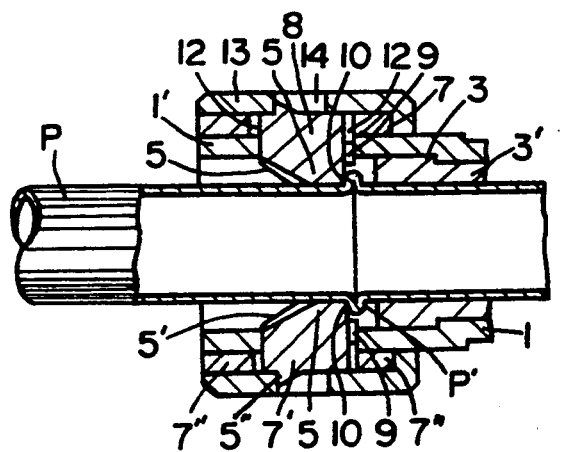
Fig. 6a
Fig. 6b
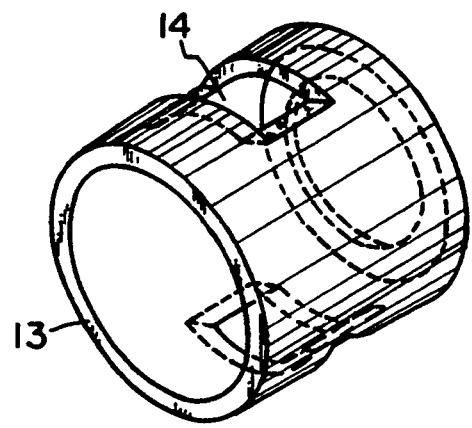

CONNECTOR FOR CONNECTING A PIPE OF SMALL DIAMETER WITH BLOCK EXPANSION PREVENTION SURFACES

BACKGROUND OF THE INVENTION

1. Field of the Invention

The present invention concerns an improvement for a structure of a connector for connecting metal or synthetic resin tubes of a relatively small diameter of less than about 20 mm, which are often disposed and used as a pipe-line for supplying oils and gases generally in automobiles or various kinds of machineries and equipments (hereinafter simply referred to as a pipe).

2. Description of the Prior Art

The connector of the aforementioned type has been constituted so far, for example, as shown in FIG. 23 such that a receptacle member 22 having a pair of resilient finger walls 23 which are situated at a portion forward in the inserting direction of circumferential wall of around a through hole at the axial center of a connector main body 21 and protruded being inclined forward is engaged to a stepped portion 24 of a connector main body disposed to the rear annular circumferential wall 23' at an engaging wall 21 in the rear portion of the connector main body 21 and, in this state, a pipe $P_0$ is connected by engaging the finger wall 23 to an annular bulged wall $P_0'$ of the incorporated pipe $P_0$.

Further, a connector in Japanese Patent Publication Sho 64-10711, is constituted such that a retaining element is inserted into the housing (connector main body), a jaw end of the retainer element is urged to expand outward by the annular surface of a pipe as it is inserted thereby enabling the insertion of the pipe and, when the jaw end passes over the annular surface, the Jaw end returns to its inward home position and abuts against the engaging wall of the pipe to prevent it from slipping off.

Furthermore, a connector as shown, for example, in Japanese Utility Model Laid-Open Hei 1-136791 has such a constitution that incorporating at the inside of a connector main body upon pipe connection is visually observed reliably by the deformation of a sensing finger incorporated in the connector main body as an observation means.

However, in the prior art shown in FIG. 23, since the connector is engaged to the annular bulged wall $P_0'$ due to the snapping function of the finger wall 23 in the connection state of the pipe $P_0$, the engagement between them is somewhat unreliable. Then, when tension is exerted on the pipe $P_0$ due to the fatigue for long period of time of the finger wall 23, the top end of the finger wall is expanded to cause disengagement, thereby making the connection instable and tending to induce undesirable leakage.

Further, in the pipe connector as described in Japanese Patent Publication Sho 64-10711, since it is necessary that the diameter of the retainer is larger as compared with that of the pipe in order to obtain a snapping action of a resilient finger of the retainer upon inserting the pipe and the length of the retainer is also increased, the size of the connector main body is made larger which is not suitable to disposition in a narrow space. Further, since the clipping lug end for detaching the pipe is protruded, it involves such a problem that the pipe may be detached accidentally due to interference with other parts, etc.

Furthermore, in the prior art as described in Japanese Patent Utility Model Laid-Open Hei 1-136791, since the sensing finger is small, it is difficult to confirm connection in a narrow or dark place. In addition, since the sensing finger deforms to some extent even if the locked state is insufficient and it leads to a problem of erroneously recognizing this as complete locking.

OBJECT OF THE INVENTION

In view of the present situations for the connector for connecting a pipe of small diameter of this pipe as described above, it is an object of the present invention to provide a connector for connecting a pipe of small diameter capable of reliably maintaining engagement at a bulged wall of a pipe for a long period of time, free from the worry of disengagement even if a tension is applied externally to the pipe and capable of making the connection stable.

Another object of the present invention is to provide a connector for connecting a pipe of small diameter having a connection observation member of a simple structure, capable of detaching the observation member both in the axial direction and in the circumferential direction, enabling handling convenient even in a narrow space, capable of easy observation again due to the moving position of a slide member also after detaching of the observation member and capable of sure visual observation from the outside.

SUMMARY OF THE INVENTION

The foregoing object of the present invention can be attained according to the first aspect of the present invention by a connector for connecting a pipe of small diameter in which a small diameter chamber and a stepped large diameter chamber in communication with a flow bore of a cylindrical connection wall are perforated on the side of the top end at the axial inside of a connector main body, recessed windows are disposed being opposed to each other to the circumferential wall of the large diameter chamber and the circumferential wall at the rear end thereof is formed as an engaging wall, a seal ring member and a bush member therebehind are incorporated in the small diameter chamber, the rear end of the large diameter chamber is engaged by the engaging wall and a separate receptacle member having a pair of finger walls protruded being opposed to each other in the inserting direction thereof, in which connection is made by engaging the finger wall to an annular bulged wall disposed near the connection end of a pipe incorporated to the inside of the connector main body in a state of connecting the pipe, wherein the receptacle main body comprises an annular circumferential wall to be attached on the outer circumferential surface at the rear part of the connector main body and a pair of finger walls each of a square block form being disposed to each other and protruded substantially in perpendicular to the axial direction, having a tapered surface diverging at the rear end, which are formed to the inside at the top end in contiguous with a resilient arm extending circumferentially in the circumferential wall along a slit while leaving an annular wall at least to one end of the cylindrical wall, in an integrated structure, in which an expansion prevention means for the finger wall of the receptacle member is disposed in a connection state where the finger wall is engaged to a bulged wall of the pipe.

In a preferred embodiment, the expansion prevention means is constituted by forming an engaging surface between the rear end of tile receptacle member and the engaging wall of the recessed window to each other is formed as an inclined surface diverging toward the top end.

In another embodiment, the expansion prevention means comprises a resilient cylindrical retainer attached to the outer circumferential surface of the receptacle member so as to move in the axial direction or rotate in the circumferential direction in the connection state in which the finger wall of the receptacle member engages the bulged wall of the pipe.

In a further embodiment, the expansion prevention means comprises a resilient cylindrical retainer having a protrusion engaging the slit and attached to the outer circumferential surface of the receptacle member so as to rotate only in the circumferential direction in the connection state in which the finger wall of the receptacle member engages the bulged wall the pipe.

In a still further embodiment, the expansion prevention means comprises a circumferential protrusion disposed to the side wall surface of the finger wall of the receptacle member and engaging tile inner circumferential surface of the connector main body by the rotation of the receptacle member in the circumferential direction in the connection state where the finger wall of the receptacle member engages the bulged wall of the pipe.

The foregoing object can also be attained according to the second aspect of the present invention by a connector for connecting a pipe of small diameter, in which a small diameter chamber and a stepped large diameter chamber in communication with a flow bore of a cylindrical connection wall are perforated on tile side of the top end at the axial inside of a connector main body, recessed windows are disposed to the circumferential wall of the large diameter chamber and the circumferential wall at the rear end thereof is formed as an engaging wall, a seal ring member and a bush member therebehind are incorporated in the small diameter chamber, the rear end of the large diameter chamber is engaged at the engaging wall by a separate receptacle member having a pair of finger walls protruded being opposed to each other in the inserting direction thereof, and connection is made by the finger wall to an annular bulged wall disposed near the connection end of a pipe incorporated to the inside of the connector main body in a state of connecting the pipe, wherein the receptacle main body comprises an annular circumferential wall to be attached on the outer circumferential surface at the rear part of the connector main body, a pair of finger walls each of a square block form being disposed to each other and protruded substantially in perpendicular to the axial direction, having a tapered surface diverging at the rear end which are formed to the inside at the top end in contiguous with a resilient arm extending clrcumferentially in the circumferential wall along a slit while leaving an annular wall at least to one end of the cylindrical wall in an integrated structure, and a rotational torque receiving portion disposed to the outer circumferential surface of at least one of the annular walls, in which the front surface of the finger wall disposed to the arm situated in the recessed window of the connector main body is formed as an engaging surface to an annular bulged wall of an incorporated pipe, the rear face thereof is formed as an engaging surface of the tapered surface and the engaging wall, another rotational torque receiving portion is disposed also to the outer circumferential surface of the connector main body, so that engagement between the annular bulged wall of the pipe and the finger wall of the receptacle member is released by the relative rotation of the receptacle member and the connector main body.

The foregoing object can further be attained according to the third aspect of the present invention by a connector for connecting a pipe of small diameter comprising a connector main body having a large diameter chamber in communication with a flow bore of a cylindrical wall on the side of the top end at the axial inside thereof in which a resilient seal ring and a bush are incorporated in the large diameter chamber and window holes are disposed being opposed to each other in the circumferential wall at the rear portion, a retaining member having a recess penetrating the circumferential wall of the cylindrical member, a slide member sliding in the radial direction and having stopper walls on both ends fitting in the window holes in contiguous with the arm, protruded inward to a guide groove disposed to the engaging hole for engaging the annular bulged wall of the pipe to be connected and incorporated with the recessed groove at the outer circumferential surface, and an observation member of a substantially semi-circular cross section having an arm lever with a protruding wall engaging the recessed groove extended to the position for said slide member so as to be detachable.

In accordance with the first aspect of the present invention, in a connection state in which the finger wall of the receptacle member engages the bulged wall of the pipe, the expansion of the finger wall can be prevented over a long period of time to reliably maintain the engagement in cooperation with the square block shape of the finger wall by the expansion prevention means comprising the engaging structure of forming the engaging surface with respect to the engaging wall of the recessed window as an inclined surface diverging toward the top end, an attaching structure by the retainer moving in the axial direction or rotating in the circumferential direction, an attaching structure by the retainer rotating only in the circumferential direction by engaging the protrusion to the slit and, further, a structure of the finger wall having the circumferential protrusion engaging by the rotation in the circumferential direction, so that highly reliable and stable connection can be maintained with no leakage without worry of detachment even when an external tension is exerted on the pipe in the connected state.

In accordance with the second aspect of the present invention, the diameter of the receptacle member can be made smaller by the structure of a pair of finger wall substantially of a square shape protruded inward at the top end of the resilient arm extending in the circumferential direction of the circumferential wall while leaving an annular wall at least on one end of the cylindrical wall and by the function of the arm capable of freely expanding radially in the Finger wall. Accordingly, the entire connector including the connector main body can be made compact and disposed even in a narrow space. Further, the receptacle member can be attached easily by pressing in a state where the finger wall behind opens slightly. Further, the connection can be made rapidly since the finger walls expand outward by the abutment of the pipe against the tapered surface at the bulged wall upon assembling along with the insertion from behind and then the finger walls return due to the resiliency of the arm after the passage over the bulged portion to engage the finger walls and the bulged wall. Furthermore, the resilient engaging force at the bulged wall can be increased due to the substantially square short shape of the finger wall in the engaging structure of the finger wall disposed to the arm portion situated in the recessed window to the bulged wall on the side of the front surface in a state where the receptacle member is engaged. In addition, since the receptacle member slightly slides backward and abuts against the receiving wall the force applied in the direction of extracting the pipe is received by the receptacle and not exerted on the arm, it is possible to eliminate the worry of "fatigue in resiliency". Furthermore, when the top end wall of the arm and the abutting wall of the recessed window of the connector main body form an appropriate angle, that is, an angle of θ relative to the center line of the finger wall, the resilient arm tends to expand radially outward upon rotation of the receptacle member around the axis of the connector main body, so that the pipe can be detached easily, if necessary, from the connector. Further, it is possible to maintain the locked state or lock opened state of the finger wall of the receptacle member to the pipe due to the click structure comprising protrusion and recess disposed to the corresponding circumferential surface and facilitate the pipe detaching operation, as well as it is possible to prevent erroneous detachment. Also for the rotational angle, it is possible to prevent erroneous excess turning by the stopper structure. Further, when the spring part is assembled to the receptacle member or the connector main body, it is possible to gradually increase the rotational torque near the completion of the rotation and automatically return it after the detachment of the click.

Further, in accordance with the third aspect of the present invention, the slide member is moved while being raised radially outward by the engagement of the bulged wall of the pipe to the retaining member along with the incorporation of the pipe into the connector main body and the observation member is expanded or detached along with expansion by this movement. Accordingly, means for observing adequate incorporation of the pipe can be made simple, and the observation member can be detached both in the axial direction and the circumferential direction, thereby making the handling convenient even in a narrow space. Further, observation can be facilitated again by the moved position of the slide member also after the detachment of the observation member, so that visual confirmation from the outside can be conducted reliably.

DESCRIPTION OF THE ACCOMPANYING DRAWINGS

FIG. 5 is a view for another embodiment, corresponding FIG. 2;

FIG. 6a is a partially cut away longitudinal cross sectional view illustrating a portion of another embodiment;

FIG. 6b is a perspective view for a retainer used in the embodiment shown in FIG. 6a;

FIG. 7b is a cross sectional taken along line B—B in FIG. 7a;

FIG. 8b is a cross sectional view taken along line C—C in FIG. 8a;

FIG. 9b is a view showing the state after rotation of the receptacle member shown in FIG. 9a;

DESCRIPTION OF THE PREFERRED EMBODIMENTS

Description will now be made sequentially to each of embodiments of the first to third aspects according to the present invention with reference to the drawings.

Figure 1:
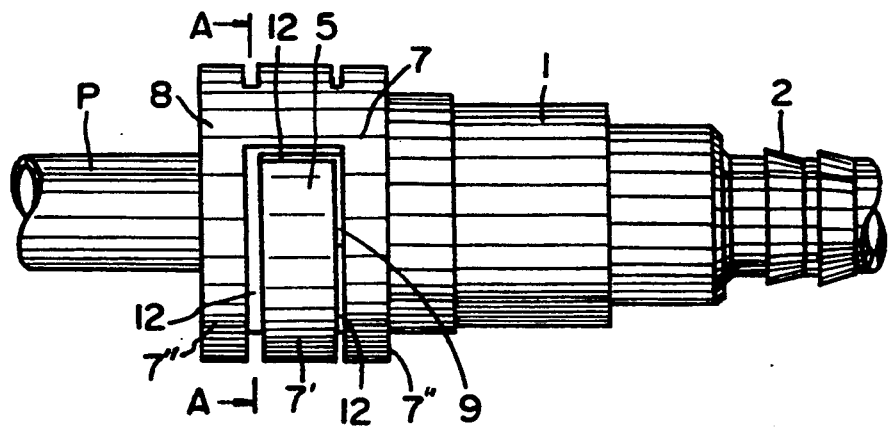
FIG. 1 is a plan view of a connector for connecting a pipe of small diameter in a connected state of a preferred embodiment of a first aspect according to the present invention.
Figure 2:
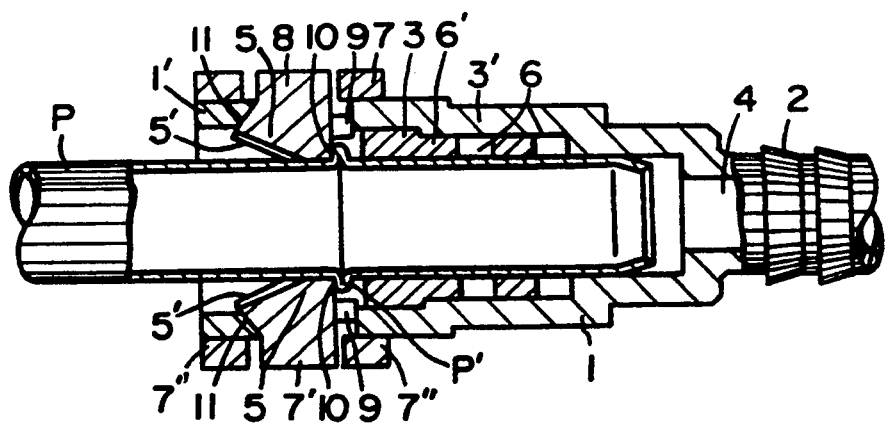
FIG. 2 is a longitudinal cross sectional view of the connector shown in FIG. 1.
Figure 3:
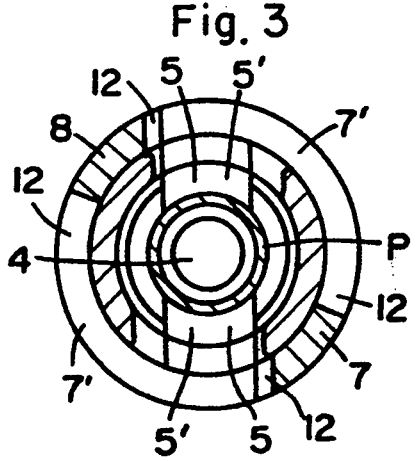
FIG. 3 is a cross sectional view taken along line A—A in FIG. 1.
Figure 4:
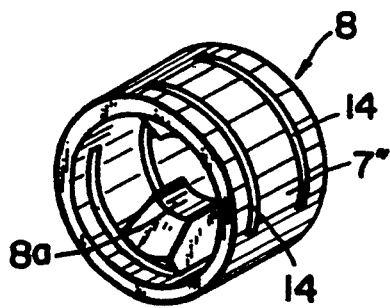
FIG. 4 is a perspective view of a receptacle member.
Figure 7A:
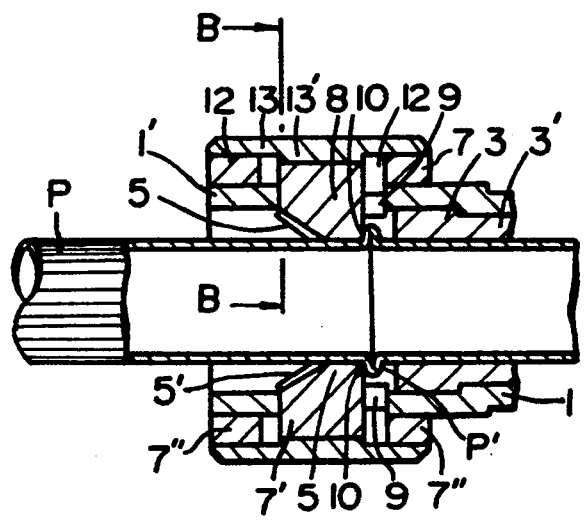
FIG. 7a is a cross sectional view taken along line B'—B' in FIG. 7b for a further embodiment, corresponding to FIG. 4.
Figure 7B:
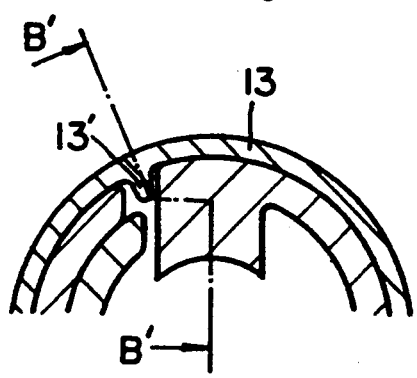
Figure 8A:
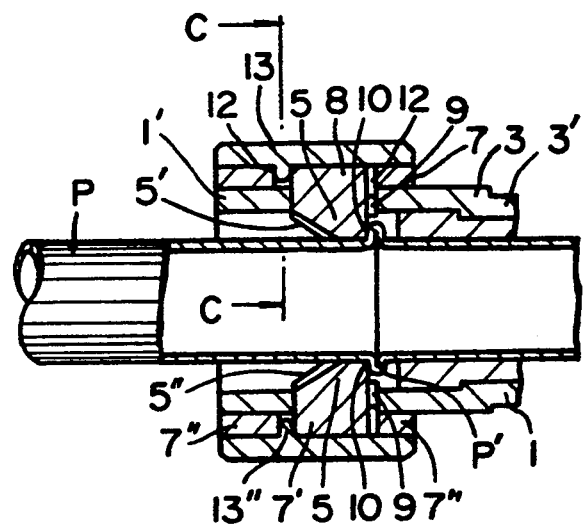
FIG. 8a is a cross sectional view taken along line C'—C' in FIG. 8b for a still further embodiment corresponding to FIG. 4.
Figure 8B:
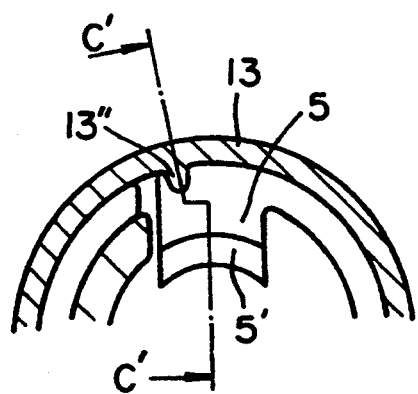
Figure 9A:
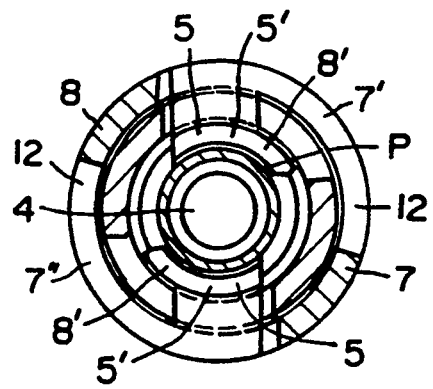
FIG. 9a is a view illustrating the state before rotation of a spectacle member showing a still further embodiment corresponding FIG. 3.
Figure 9B:
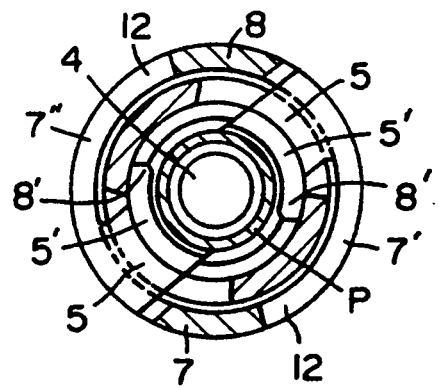

FIG. 1 through FIG. 9 are views for explaining the embodiments of the first aspect according to the present invention, in which FIG. 1 is a plan view of a connector for connecting a pipe of small diameter in a connected state of a preferred embodiment of a first aspect according to the present invention, FIG. 2 is a longitudinal cross sectional view of the connector shown in FIG. 1, FIG. 3 is a cross sectional view taken along line A—A in FIG. 1, FIG. 4 is a perspective view of a receptacle member, FIG. 5 is a view for another embodiment, corresponding FIG. 2, FIG. 6a is a partially cut away longitudinal cross sectional view illustrating a portion of another embodiment, FIG. 6b is a perspective view for a retainer used in the embodiment shown in FIG. 6a, FIG. 7a is a cross sectional view taken along line B'—B' in FIG. 7b for a further embodiment, corresponding to FIG. 4, FIG. 7b is a cross sectional taken along line B—B in FIG. 7a, FIG. 8a is a cross sectional view taken along line C'—C' in FIG. 8b for a still further embodiment corresponding to FIG. 4, FIG. 8b is a cross sectional view taken along line C—C in FIG. 8a, FIG. 9a is a view illustrating the state before rotation of a spectacle member showing a still further embodiment corresponding FIG. 3, FIG. 9b is a view showing the state after rotation of the receptacle member shown in FIG. 9a.

At the axial inside of a connector main body 1, are perforated a small diameter chamber 3' a stepped large diameter chamber 3 disposed therebehind, which are in communication with a flow bore 4 of a circumferential connection wall of a resin tube, rubber hose or the like (not illustrated) at the side of the top end. Recessed windows p are disposed being opposed to each other through the circumferential wall of the large diameter chamber 3, and the circumferential wall at the rear end thereof is formed as an engaging wall 1'. A plurality of elastic seal ring members 6 are disposed each by way of a spacer on the side of the small diameter chamber 3' and a stepped bush member 6' is disposed behind the seal ring members 6. A receptacle member 8 made of a resilient member such as a resin is attached to the rear part of the connector main body 1. The member 8 comprises, in an integral structure, an annular cylindrical wall 7 to be attached and an arm 7' extending circumferentially in the circumferential wall along a slit 12 while leaving an annular wall 7" at least on one end and a pair of finger walls 5 each in a square block form being opposed to each other disposed to the inside at the top end of the arm 7', protruded substantially in perpendicular to the direction of the axial center and having a tapered surface 5' at the rear end that diverges backward. In a state where the receptacle member 8 is engaged to the connector main body 1, the front surface of the finger wall 5 in contiguous with the arm 7' situated at the recessed window 9 is defined as an urging surface 10 to an annular bulged wall P' disposed near the connection end of the pipe P while the engaging surface between the other rear end face and the engaging wall 1' in the recessed window 9 is defined as an inclined surface 11 diverging toward the top end (refer to FIG. 2) so that they are engaged in the connected state of the pipe P to prevent expansion at the finger wall 5. As shown in FIG. 5, it is not always necessary that the rear end surface of the finger wall 5 engages the entire surface at the end of the engaging wall 1'. Further as another embodiment, a cylindrical retainer member 13 made of an elastic material may be mounted to the outer circumferential surface of the receptacle member 8 such that the member moves in the axial direction (FIG. 6), thereby causing the protrusion 5" disposed to the outer circumferential surface of the finger wall 5 to engage a window 14 perforated in the circumferential wall thereof to prevent the finger wall from expanding outward and such that it inhibits the relative movement with respect to the receptacle in the circumferential direction and the axial direction. Further, a linear ridge 13' extended in the axis direction (FIG. 7) or a cylindrical protrusion 13' (FIG. 8) may be disposed to the inner circumferential surface of the retainer member 13, so that the protrusion engages the slit 12 and rotates only in the circumferential direction. Furthermore, circumferential protrusions 8' are disposed to the side wall surface of the finger wall of the receptacle member 8 for engaging the receptacle member 8 to the inner circumferential surface of the connector main body 1 by rotation in the circumferential direction from FIG. 9a to FIG. 9b, thereby preventing expansion of the finger wall 5.

Figure 10:
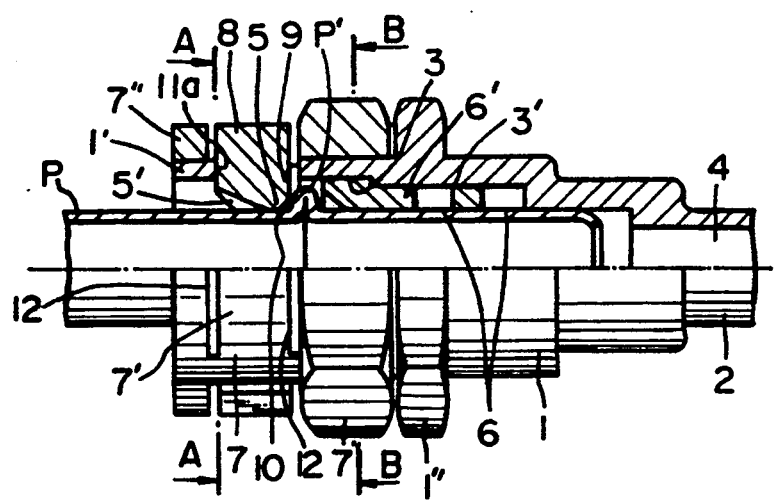
FIG. 10 is a partially cut away plan view of a connector for a pipe in a connected state for a preferred embodiment of the second aspect according to the present invention.
Figure 11:
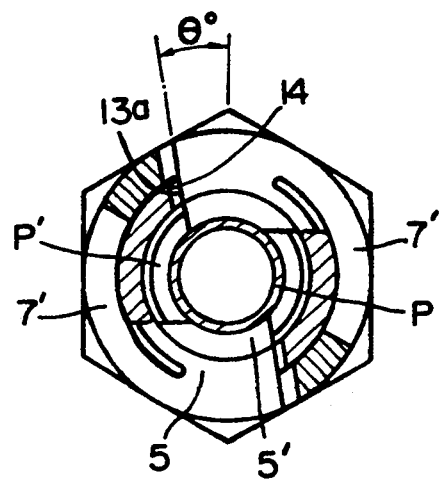
FIG. 11 is a view taken along line A—A in FIG. 10.
Figure 12:
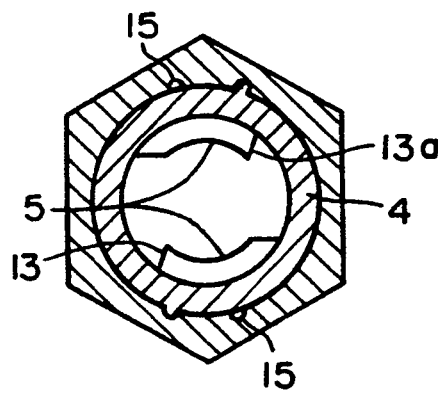
FIG. 12 is a view in a locked state taken along line B—B in FIG. 10.
Figure 13:
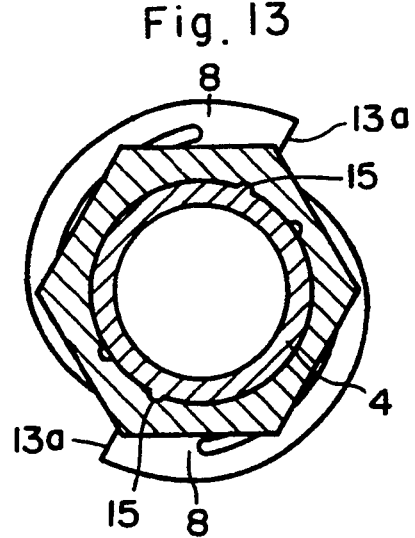
FIG. 13 is a view in a lock opening state taken along line B—B in FIG. 10.

Description will now be made to preferred embodiments of the second aspect according to the present invention, in which FIG. 10 is a partially cut away plan view of a connector for a pipe in a connected state for a preferred embodiment of the second aspect according to the present invention, FIG. 11 is a view taken along line A—A in FIG. 10, FIG. 12 is a view in a locked state taken along line B—B in FIG. 10, FIG. 13 is a view in a lock opening state taken along line B—B in FIG. 10.

In a connector main body 1 shown in the drawings, a small diameter chamber 3 and a stepped large diameter chamber 3 therebehind are perforated on the side of the top end at the axial inside thereof in communication with a flow bore 4 of a cylindrical connection wall 2 of a resin tube or rubber hose (not illustrated). A recessed window 9 is disposed to the circumferential wall of the large diameter chamber 3, the circumferential wall at the rear end thereof is formed as an engaging wall 1', and a rotational torque receiving portion, for example, a hexagonal dual phase portion 1" for engaging a wrench is formed to the outer circumferential on the side of the top end of the recessed window 9. Then, a plurality of elastic seal ring members 6 such as made of rubber are disposed each by way of a spacer on the side of the small diameter chamber 3' and preferably a stepped bush member 6 is inserted at the back thereof.

A receptacle member 8 made of a resilient material such as resin is attached on the rear side over the stepped outer circumferential surface of the connector main body 1. It has an attached annular cylindrical wall 7 and a resilient arm 7' extending in the circumferential direction the circumferential wall along a slit 12 while leaving an annular walls 7 on one or both sides (on both sides in the illustrated embodiment) in the annular cylindrical wall. A pair of finger walls 5 each of a block form disposed to the inside at the top end of the resilient arm, protruded at a position opposed to each other substantially in perpendicular to the axial direction in which the rear end thereof is defined as a tapered surface 5' diverging rearward that abuts against an annular bulged wall p' disposed near the connection end on the side of the pipe upon connecting the pipe P. A rotational torque receiving portion, for example, a hexagonal dual face portion, engaging a wrench is formed to the outer circumferential surface on the side of the top end of the annular walls 7", in an integral structure. Then, in a state where the receptacle member 8 is engaged over the connector main body 1, the front face of the finger wall of the arm situated at the recessed window 9 on the side of the connector main body 1 is formed as an engaging surface 10 to the annular bulged wall P' of the assembled pipe P, while the other near side is formed as an engaging surface 11a between at the tapered surface 5' an engaging wall 1' in the recessed window 9. Then, by relatively rotating the receptacle member 8 and the connector main body 1, engagement between the annular bulged wall P' of the pipe P and the finger wall 5 of the receptacle member 8 can be released. Further, the pipe is detached manually or by using a tool such as a wrench. When the receptacle member 8 is rotated around the axis of the connector main body 1, the top end wall 13a of the resilient arm 7' and the abutting wall 14 of the recessed window 9 of the connector main body 1 have such an angle between them that they move slidably to each other by the rotation so as to easily expand the resilient arm 7 to the radial outside. That is, when an inclination of angle θ from 5 to 30°, preferably, about 15° is formed relative to the center line of the finger wall 5 considering easy detaching and withdrawing strength of the pipe P (refer to FIG. 11) and, the pipe P is easily detached if necessary. If the angle θ is increased, since the top end wall 13a' and the abutting wall 14 slide more easily to each other, the resilient arm 7' tends to open easily and the abutting area between the annular bulged wall P' and the engaging surface 10 is reduced to lower the strength. Further, for positioning the rotational direction between the receptacle member 8 and the connector main body 1, a click 15 may be formed by disposing protrusions or recesses at the rear portion of the stepped outer circumferential surface formed to the connector main body 1 or recesses or protrusions at corresponding positions to the inner circumferential surface of the annular wall 7" of the receptacle member 8.

Figure 14:
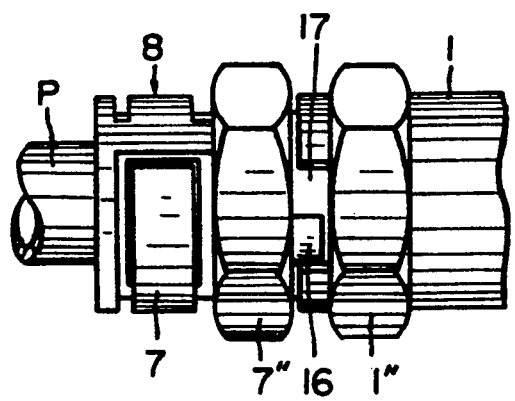
FIG. 14 is a plan view for a portion illustrating another embodiment of a click structure.
Figure 15:
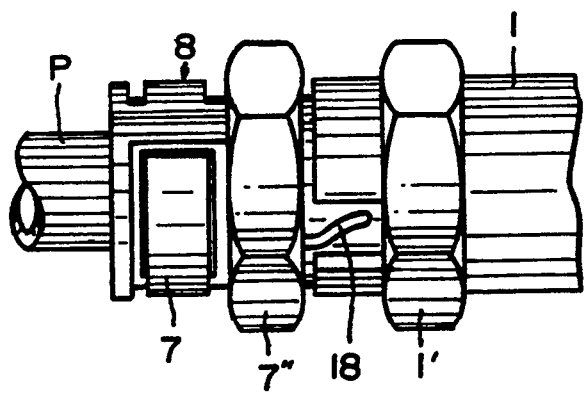
FIG. 15 is a plan view of a further embodiment of the click structure.

The recesses and the protrusions constituting the click 15 engage to each other by the rotation of the receptacle member 8 to maintain the locked state of the finger wall 5 against the pipe P (FIG. 12) or the unlocked state (FIG. 13), making the detaching operation of the pipe P easy, as well as preventing accidental detachment. Further, for avoiding disengagement of the finger from the hole of the connector main body 1 by excess rotation of the receptacle member 8 when a wrench or the like is used for detaching the pipe, a stopper 16 and a stopper receiving groove 17 may preferably be disposed between the receptacle member 8 and the connector main body 1 as shown in FIG. 14 so as to inhibit excess rotation than required. Furthermore, for returning the receptacle member 8 more reliably, a resilient part 18 may be assembled resiliently to the receptacle member 8 as shown in FIG. 15 or the connector main body 1 (not illustrated).

Figure 16:
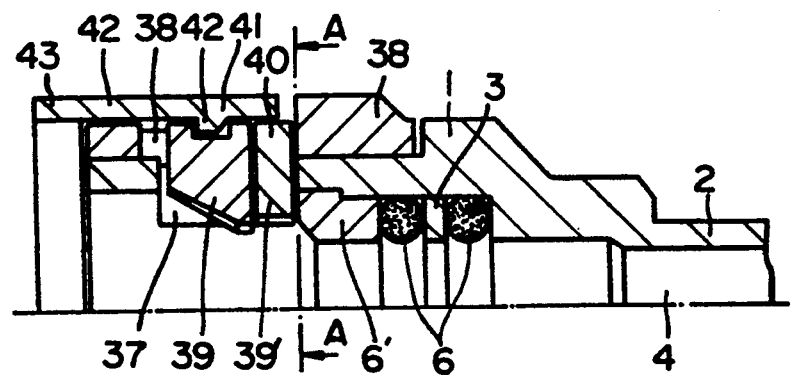
FIG. 16 is a longitudinal cross sectional view for one-half portion of a connector for connecting a pipe of small diameter for a preferred embodiment of the third aspect according to the present invention.
Figure 17:
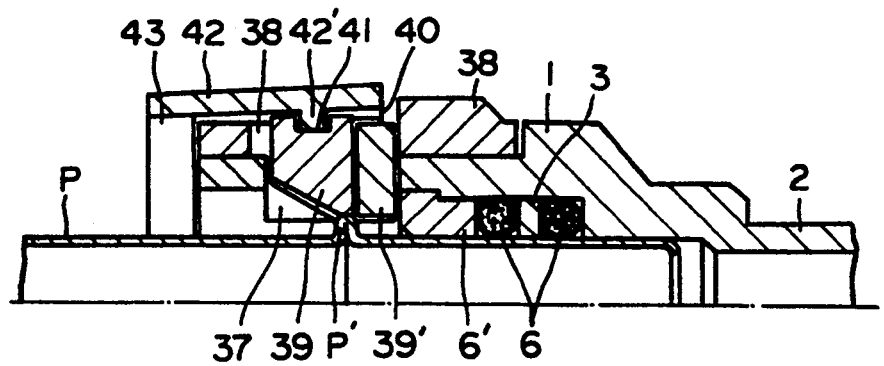
FIG. 17 is a view showing a stable in the assembling steps upon connecting the pipe.
Figure 18:
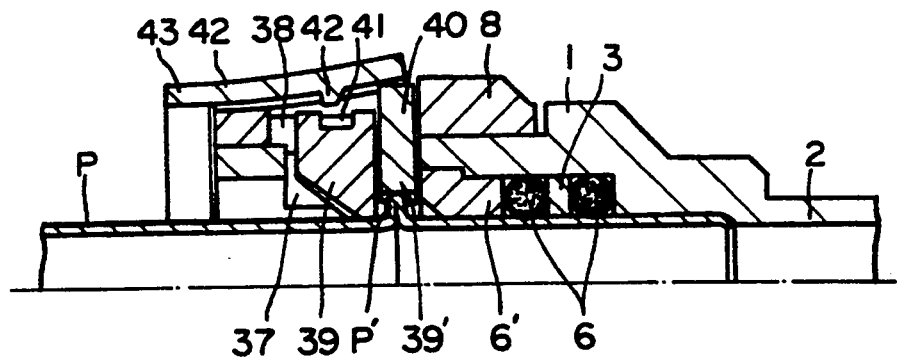
FIG. 18 is a view showing the state after connecting the pipe in FIG. 16.
Figure 19:
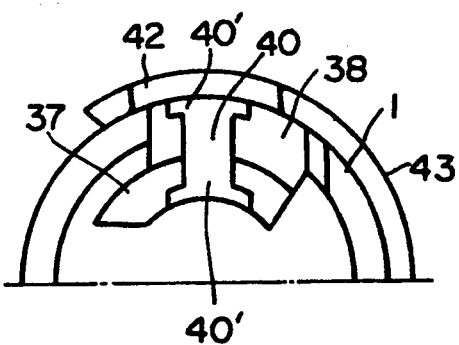
FIG. 19 is a cross sectional view for a portion corresponding ti line A—A in FIG. 16.
Figure 20:
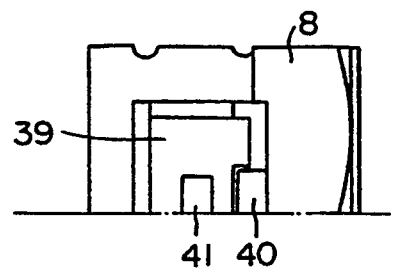
FIG. 20 is an upper plan view illustrating a relationship between a engaging wall and a sliding member in a holding member.
Figure 21:
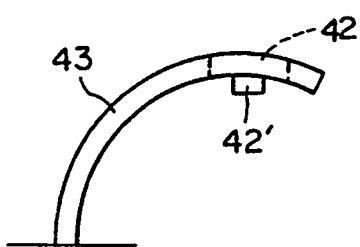
FIG. 21 is a front elevational view of an observation member in FIG. 16.
Figure 22:
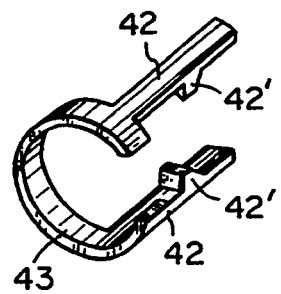
FIG. 22 is a perspective view of the observation member.
Figure 23:
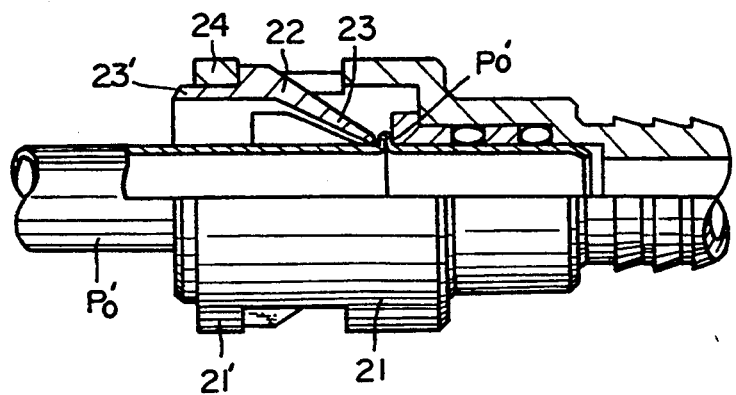
FIG. 23 is a partially cut away cross sectional view of a connector for connecting a pipe of small diameter in the prior art in the connection state.

FIG. 16 through FIG. 22 are views for explaining preferred embodiments of the third aspect according to the present invention, in which FIG. 16 is a longitudinal cross sectional view for one-half portion of a connector for connecting a pipe of small diameter for a preferred embodiment of the third aspect according to the present invention, FIG. 17b is a view showing a stable in the assembling steps upon connecting the pipe, FIG. 18 is a view showing the state after connecting the pipe in FIG. 16, FIG. 19 is a cross sectional view for a portion corresponding ti line A—A in FIG. 16, FIG. 20 is an upper plan view illustrating a relationship between a engaging wall and a sliding member in a holding member, FIG. 21 is a front elevational view of an observation member in FIG. 16, FIG. 22 is a perspective view of the observation member.

In a connector main body 1, a large diameter chamber 3 in communication with a flow bore 4 of a cylindrical wall 2 on the side of the top end in connection with a base end and in connection with a flexible hose is disposed at the axial center thereof, and resilient seal rings 6 and a bush 6' made of rubber material or the like are incorporated in the large diameter chamber. Window holes 37 are disposed respectively being opposed to each other at the rear circumferential wall. A retaining member 38 is in contiguous with an arm having a recess 38' penetrating the circumferential wall of the cylindrical member and has an engaging wall 39 which is protruded inward fitting into the window holes 37 on the side of the connector main body 1 for engaging an annular bulged wall P' of a pipe P to be connected and, a radial sliding member 40 having stopper walls 40' on both sides which is loosely attached to a guide groove 39' disposed to the engaging wall. The member is assembled with a recessed groove 41 formed to the outer circumferential surface. An observation member 43 substantially of a semi-circular cross section has a protruding wall 42' engaging the recessed groove 41 on the side of the retaining member 38 and has an arm lever 42 extending as far as the position for the slide member 40 and it is detachably mounted to the retaining member 38. With such a constitution, the engaging wall 39 and the slide member 40 are raised upward by the bulged wall P' of the pipe P along with the insertion of the pipe P to the inside of the axial space (FIG. 17), then the slide member 40 is moved outward along with the advance of the pipe P successively and the engaging wall 39 returns inward to engage the bulged portion P' and, simultaneously, the slide member 40 moves along with the detachment of the protrusion wall 42' on the side of the observation member 43 from the recessed groove 41 and the connection is confirmed by the outward expansion of the observation member or the outward displacement caused by the expansion (FIG. 13).

As has been described above, the connector for connecting a pipe of small diameter in the first aspect of the present invention can reliably engage and maintain the finger walls 5 for a long period of time by the expansion prevention means at the finger wall comprising the engaging structure between the inclined surfaces 11 to each other, the mounting structure of tile retainer 13 and the finger wall structure 5 disposed with the lock groove 8' in cooperation with the square block form of the finger wall 6. Accordingly, there is no worry for the disengagement of the finger wall 5 even when an external tension is applied to the pipe P in a state it is disposed and, therefore, this is an extremely useful connector for connecting a pipe of small diameter at high reliability without leakage and capable of maintaining stable connection.

Further, the connector for connecting a pipe of small diameter in the second aspect of the present invention comprises a pair of the finger walls 5 each substantially of a square shape protruding to the inside at the top end of the resilient arm 7' circumferentially extending in the circumferential wall while leaving the annular wall 7" at least on one side of the annular cylindrical wall 7 of the receptacle member 8, in which the arm 7' has a function capable of radially expanding at the finger wall and the surface of the finger wall engages the bulged wall P' in the recessed window 9 in a state where the receptacle member 8 is mounted. Accordingly, the diameter of the receptacle member 8 can be made smaller due to the structure of the finger wall 5 which is short and substantially of the square shape and the entire article including the connector main body can be made compact and disposed in a narrow place easily with no trouble. Further, since the finger wall member is of the a block form having high rigidity and excellent retaining force with the pipe as well as the top end wall 13 of the arm and the abutting wall 14 of the recessed window 9 are inclined at an angle θ relative to the center line of the finger wall, the pipe P can be detached easily from the connector by the rotation of the receptacle member 8. Further, since the locked or unlocked state of the finger wall 5 of the receptacle member 8 relative to the pipe is maintained by the click structure 15 comprising the protrusions and the recesses disposed to the corresponding circumferential surfaces to facilitate the detaching operation of the pipe P, prevent erroneous detachment and restrict the rotational angle of the receptacle member, erroneous excess turning can be avoided. Furthermore, the spring part combined to the receptacle member 8 or the connector main body 1 can provide a constitution of gradually increasing the rotational torque and automatic return upon detachment of the click 15 and airtightness can be maintained and stable connection can be kept with high reliability over a lone period of time. Thus, an extremely useful pipe connector can be obtained.

Further, since the connector for connecting a pipe of small diameter in the third aspect according to the present invention is adapted such that the observation member 43 mounted outside is expanded or detached by the expansion along with the insertion of the pipe P to the inside of the connector main body 1 upon connection of the pipe P, particularly, due to the movement of the slide member 40 toward the radial outside, the observation means can be simplified, it can be detached both in the axial direction and the circumferential direction to make the handling convenient even in a narrow place. Further, after detaching of the observation member 43, since observation can be made easily again due to the moving position of the slide member 40, visual confirmation from the outside can be conducted reliably. Thus, this is an extremely useful connector for connecting a pipe of small diameter.

What is claimed is:

1. A connector for connecting a thin pipe, said pipe having a connecting end and an outwardly bulged wall spaced from said connecting end, said connector comprising:

a connector body having opposed front and rear ends, a flow bore extending rearwardly into the front end of the connector body, a peripheral wall extending forwardly from the rear end of the connector body and defining at least one chamber extending forwardly into the rear end of the connector body and communicating with the flow bore, the peripheral wall including an inner surface defining the chamber and an opposed outer surface, opposed windows extending through the peripheral wall from the outer surface to the inner surface at locations spaced forwardly from the rear end of the connector body, each said window defining a forwardly and inwardly facing expansion prevention surface on the peripheral wall and a rearwardly facing surface;

annular seal members disposed in the chamber for sealing engagement around portions of the pipe intermediate the connecting end of the pipe and the outwardly bulged wall thereof;

a bush member mounted in the connector body rearwardly of the seal members; and a unitarily formed socket body having a cylindrical wall slidably disposed over the peripheral wall of the connector body, a pair of resiliently deflectable arms extending circumferentially from opposed locations on the socket body and engaging the outer surface of the peripheral wall of the connector body, blocks defined on deflectable ends of the respective arms and extending into the respective windows of the connector body, each said block including a rearwardly and outwardly facing expansion prevention surface engageable with the forwardly and inwardly facing expansion prevention surface on portions of the peripheral wall of the connector body defining the respective window, a front surface on each said block engageable with the rearwardly facing surface of the respective window for axially positioning the socket body on the connector body, said front surface of each said block, extending into the chamber for engagement with the outwardly bulged wall of the pipe, and a rearwardly and inwardly facing tapering wall radially inwardly from the expansion prevention surface of the corresponding block;

whereby the blocks and the corresponding arms deflect outwardly in response to forces exerted by the outwardly swelling annular wall of the pipe on the tapering surface of the block during insertion of the pipe into the connector body, and whereby the engagement of the front surface of each said block with the outwardly bulged wall and the engagement of the rearwardly and outwardly facing expansion prevention surface of the block with the forwardly and inwardly facing expansion prevention surface of the peripheral wall securely retains the pipe in the connector body and prevents outward deflection of said arms in response to rearwardly directed forces on the pipe.

2. A connector as in claim 1, wherein the rearwardly facing surface of each said window and the front surface of each said block are radially aligned.

* * * * *